(12) United States Patent
Oh et al.

(10) Patent No.: US 11,760,207 B2
(45) Date of Patent: Sep. 19, 2023

(54) CONTROL DEVICE AND METHOD OF ELECTRIC VEHICLE FOR REALIZING VIRTUAL DRIVE SYSTEM SENSIBILITY

(71) Applicants: HYUNDAI MOTOR COMPANY, Seoul (KR); KIA CORPORATION, Seoul (KR)

(72) Inventors: Ji Won Oh, Hwaseong-si (KR); Jeong Soo Eo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 224 days.

(21) Appl. No.: 17/354,183

(22) Filed: Jun. 22, 2021

(65) Prior Publication Data

US 2022/0153144 A1   May 19, 2022

(30) Foreign Application Priority Data

Nov. 17, 2020   (KR) .......................... 10-2020-0153341

(51) Int. Cl.
  *B60L 15/20*   (2006.01)
(52) U.S. Cl.
  CPC .......... *B60L 15/20* (2013.01); *B60L 2240/423* (2013.01); *B60L 2260/20* (2013.01)
(58) Field of Classification Search
  CPC ............... B60L 15/20; B60L 2240/423; B60L 2260/20; B60L 2260/26; B60L 2260/42; B60L 50/10; B60L 2250/24; B60W 50/14; B60W 10/08; B60W 40/08; B60W 2050/0022; B60W 2510/083; B60W 2710/083; B60Y 2200/91
  See application file for complete search history.

(56) References Cited

U.S. PATENT DOCUMENTS

| 10,807,600 | B2 * | 10/2020 | Jordan, III | ............ B60W 50/14 |
| 2021/0053487 | A1 * | 2/2021 | Vangelov | ............... B60K 35/00 |
| 2022/0041064 | A1 * | 2/2022 | Nishimine | ............... B60L 50/10 |
| 2022/0041065 | A1 * | 2/2022 | Isami | ................... B60L 15/2054 |
| 2022/0041155 | A1 * | 2/2022 | Isami | ................... B60L 15/2054 |

FOREIGN PATENT DOCUMENTS

| CN | 109177742 A | * | 1/2019 | ............... B60L 15/20 |
| KR | 20160099872 A | * | 8/2016 | ............... B60L 50/51 |

* cited by examiner

*Primary Examiner* — Michael J Zanelli
(74) *Attorney, Agent, or Firm* — MCDONNELL BOEHNEN HULBERT & BERGHOFF LLP (57) ABSTRACT

A control device and method of an electric vehicle for realizing virtual drive system sensibility is disclosed. A main objective is to provide the control device and method of the electric vehicle capable of realizing and providing differentiated driving sensibility that may be felt in other drive systems such as a drive system of an internal combustion engine vehicle. The control method includes determining a basic torque command, for controlling operation of a driving motor, from vehicle driving information collected by a controller while driving a vehicle; determining a virtual drive system torque command, which is a corrected torque command for realizing virtual drive system sensibility, from a determined basic torque command by using a virtual drive system model preset in the controller, and controlling torque of the driving motor by the controller according to a determined virtual drive system torque command.

19 Claims, 8 Drawing Sheets

| | item | Low | Medium | High | example of torque form |
|---|---|---|---|---|---|
| exemplary embodiment 1 | vibration frequency | | √ | | |
| | damping ratio | | | √ | |
| exemplary embodiment 2 | vibration frequency | | | √ | |
| | damping ratio | | √ | | |
| exemplary embodiment 3 | vibration frequency | | | √ | |
| | damping ratio | √ | | | |
| exemplary embodiment 4 | vibration frequency | | √ | | |
| | damping ratio | | √ | | |
| exemplary embodiment 5 | vibration frequency | √ | | | |
| | damping ratio | | | √ | |
| exemplary embodiment 6 | vibration frequency | √ | | | |
| | damping ratio | √ | | | |

CONTROL DEVICE AND METHOD OF ELECTRIC VEHICLE FOR REALIZING VIRTUAL DRIVE SYSTEM SENSIBILITY

CROSS REFERENCE TO RELATED APPLICATIONS

The present application claims priority to Korean Patent Application No. 10-2020-0153341, filed Nov. 17, 2020, the entire contents of which is incorporated herein for all purposes by this reference.

BACKGROUND

Field

The present disclosure relates to a control device and method of an electric vehicle and, more particularly, to a control device and a method capable of generating differentiated virtual driving sensibility that may be felt in other drive systems such as a drive system of an internal combustion engine vehicle to provide the driving sensibility to a driver in the electric vehicle.

Description of the Related Art

As is well known, an electric vehicle (EV) is a vehicle that is driven using a motor as a driving power source of the vehicle.

The drive system of an electric vehicle includes a battery supplying electric power for driving a motor, an inverter connected to the battery and driving and controlling the motor, the motor connected to the battery to be able to be charged and discharged through the inverter, and a speed reducer decelerating and transmitting rotational force of the motor to driving wheels.

Here, when driving a motor, an inverter converts direct current (DC) supplied from a battery into alternating current (AC) to apply to the motor through a power cable, and when regenerating energy using the motor, the inverter converts the alternating current (AC) generated by the motor that operates as an electric generator into the direct current (DC) to supply to the battery, thereby serving to charge the battery.

Unlike a conventional internal combustion engine vehicle, an ordinary electric vehicle does not use a multi-speed transmission, but a speed reducer using a fixed gear ratio is disposed between a motor and driving wheels instead.

The reason is that unlike an internal combustion engine having a wide distribution range of energy efficiency depending on operating points and being able to provide high torque only in a high speed area, in the case of a motor, a difference in efficiency with respect to the operating points is relatively small, and low-speed, high-torque may be realized only with motor's individual characteristics.

Inherent vibration characteristics generated by a torsional damper, a dual mass flywheel, etc., which are used in the drive system of an internal combustion engine vehicle, are unable to occur in an electric vehicle due to characteristics of the drive system of the electric vehicle.

Absence of vibration while driving a vehicle may provide a clearly advantageous environment in terms of providing seamless and smooth drivability, but depending on a driver's propensity or a sporting propensity of the vehicle, it is also necessary to provide a driver with sensibility having vibration added for fun driving.

SUMMARY

Therefore, an embodiment of the present disclosure is devised to solve the above problems, and an objective of the present disclosure is to provide a control device and method of an electric vehicle, wherein the control device and method is able to virtually realize and simulate various characteristics, which are able to be provided by other drive systems such as a drive system of an internal combustion engine vehicle, by using a motor in the electric vehicle according to a driver's request, and enables a driver to experience driving sensibility which may be felt in other drive systems in the electric vehicle.

The objective of the present disclosure is not limited to the above-mentioned objective, and other objectives not mentioned herein will be clearly understood by those skilled in the art (hereinafter referred to as "ordinary technician") from the following description.

In order to achieve the above objective, according to an aspect of the embodiment of the present disclosure, there is provided a control method of an electric vehicle for realizing virtual drive system sensibility, the control method including determining a basic torque command, for controlling operation of a driving motor, from vehicle driving information collected by a controller while driving a vehicle, determining a virtual drive system torque command, which is a corrected torque command for realizing the virtual drive system sensibility, from a determined basic torque command by using a virtual drive system model preset in the controller, and controlling torque of the driving motor by the controller according to a determined virtual drive system torque command.

Here, the control method of the electric vehicle according to the embodiment of the present disclosure may further include changing a driver setting variable value determined in the virtual drive system model used to determine the virtual drive system torque command from the basic torque command according to a driver's change input in the controller.

In addition, according to another aspect of the embodiment of the present disclosure, there is provided a control device of an electric vehicle, the control device including a first controller generating and outputting a virtual drive system torque command, and a second controller controlling torque of a driving motor according to the virtual drive system torque command output from the first controller, wherein the first controller may include a basic torque command generation part for determining a basic torque command, for controlling operation of the driving motor, from vehicle driving information collected during driving a vehicle, and a virtual drive system mode control part for determining the virtual drive system torque command, which is a corrected torque command for realizing virtual drive system sensibility, from the basic torque command determined by the basic torque command generation part by using a set virtual drive system model in a state where the virtual drive system model is preset.

Here, the control device of the electric vehicle according to the embodiment of the present disclosure may further include an interface part provided to allow a driver to input a change of a driver setting variable value determined in the virtual drive system model set in the virtual drive system mode control part.

Hereby, according to the control device and method of an electric vehicle in accordance with the embodiment of the present disclosure, various characteristics that may be provided by other drive systems such as the drive system of an internal combustion engine vehicle may be virtually realized and simulated by using a motor in the electric vehicle according to a driver's request.

Consequently, a driver may experience driving sensibility that may be felt in other drive systems in his/her vehicle, and thus marketability of the electric vehicles may be enhanced.

In addition, it is possible for a driver to directly and freely change and adjust variables related to generation and realization of virtual drive system sensibility, so that the driver may be provided with the virtual drive system sensibility that is preferred by himself/herself.

Accordingly, the driver may be provided with the virtual drive system sensibility generated by variable values changed and adjusted by the driver himself/herself, thereby enabling personalization and differentiation of the virtual drive system sensibility in an electric vehicle.

DETAILED DESCRIPTION

Specific structures and functional descriptions presented in embodiments of the present disclosure are exemplified for the purpose of describing the embodiments according to a concept of the present disclosure only, and the embodiments according to the concept of the present disclosure may be implemented in various forms. In addition, it should not be construed as being limited to the embodiment described herein, and should be understood to include all modifications, equivalents, and substitutes included in the idea and scope of the embodiment of the present disclosure.

Meanwhile, in the embodiment of the present disclosure, it will be understood that, although the terms "first", "second", etc. may be used herein to describe various components, these components should not be limited by these terms. The terms are only used for the purpose of distinguishing one component from other components. For instance, within a scope not departing from the scope of rights according to the concept of the embodiment of the present disclosure, a first component may be referred to as a second component, and similarly, the second component may also be referred to as the first component.

It will be understood that when a component is referred to as being "coupled" or "connected" to another component, it can be directly coupled or connected to the other component or intervening components may be present therebetween. In contrast, when a component is described as being "directly connected", "directly coupled", or "directly linked" to another component, it should be understood that there are no intervening components present therebetween. Other expressions for explaining the relationship between components, such as "between", "directly between", "adjacent to", or "directly adjacent to" should be construed in the same way.

The same reference numbers throughout the specification indicate the same components. The terminology used herein is for the purpose of describing particular embodiments only and is not intended to be limiting of the embodiments of the present disclosure. In this specification, the singular form also includes the plural form unless otherwise specified. In "comprises" and/or "comprising" as used in the specification, mentioned components, steps, actions and/or elements does not exclude the presence or addition of one or more other components, steps, actions and/or elements.

The embodiment of the present disclosure relates to a control device and method of an electric vehicle for realizing virtual drive system sensibility and, more particularly, to a control device and method of an electric vehicle capable of realizing and providing differentiated virtual driving sensibility that may be felt in other drive systems.

More particularly, the embodiment of the present disclosure is to provide a control device and method, in which various characteristics that may be provided by other drive systems such as a drive system of an internal combustion engine vehicle may be virtually realized and simulated by using a driving motor in an electric vehicle according to a driver's request, so as to allow a driver to virtually experience driving sensibility of other drive systems.

When generating torque that may virtually realize and simulate the characteristics of various drive systems according to the driver's request in the electric vehicle, it is possible to implement a function that allows a driver to virtually experience various driving sensibilities in his or her vehicle without having to change the vehicle, whereby it is possible to provide differentiation and marketability improvement of the electric vehicle.

Moreover, when driving sensibility of other drive systems is differentiated according to personal preferences and is virtually provided to a driver who values the driving sensibility in an electric vehicle, not only are more differentiated fun factors of the electric vehicle highlighted, but also personalization of a drive system is possible, wherein virtual drive system sensibility is differentiated depending on the driver.

In conventional internal combustion engine vehicles, due to reasons such as fuel efficiency and emission regulations, there was a limit in realizing personalization in which drive system sensibility of a vehicle is differentiated for each driver, but in the case of electric vehicles, since there is no emission regulations, and influences on electric power consumption due to personalization of the drive system sensibility is significantly less than that of the internal combustion engine, it is possible to actively personalize the virtual drive system sensibility, whereby it is possible to improve sensibility quality of a vehicle.

Accordingly, the embodiment of the present disclosure discloses a control device and method of an electric vehicle capable of providing differentiated driving sensibility to a driver in the electric vehicle by establishing a virtual drive system model and realizing characteristics of other drive systems on the basis of motor torque control.

In particular, the embodiment of the present disclosure discloses a control device and method for realizing the virtual drive system sensibility of the electric vehicle, wherein a driver may directly and freely change and adjust model setting variable values (which are driver setting variable values to be described later) related to generation and realization of the virtual drive system sensibility, so that the driver may be provided with his or her favorite virtual drive system sensibility and characteristics.

In the following description, a motor means a driving motor that drives a vehicle, and in the embodiment of the present disclosure, a vehicle to be controlled may be an electric vehicle equipped with a speed reducer, without having an internal combustion engine (i.e., general engine) and a multi-speed transmission.

In the embodiment of the present disclosure, drive system sensibility or drive system driving sensibility may mean that vibration of a driving system is included, wherein the vibration is able to be felt by a driver according to the control and driving state of the driving system in a vehicle while driving.

In the embodiment of the present disclosure, the vibration of the drive system may mean vibration (i.e., variation) of motor torque (i.e., driving force) that may be felt by a driver, and when there is the vibration of the motor torque while driving, the driver may feel the vibration of the motor torque as the vibration of a vehicle. In order to realize such vibration of a drive system, it is possible to generate and apply a motor torque command that includes a vibration component.

That is, as described later, a virtual drive system torque command having a vibration characteristic of a predetermined frequency, damping ratio, and amplitude and having a value that changes in a vibration form is generated and applied, and a torque output of a driving motor is controlled according to the virtual drive system torque command, so that a desired vibration of a virtual drive system may be produced.

In addition, the personalization of virtual drive system sensibility means that a driver directly changes and adjusts a set value of a variable related to generation and realization of virtual drive system sensibility (i.e., driving sensibility), so that individually differentiated virtual drive system sensibility corresponding to a changed set value is generated and realized.

Hereinafter, the embodiment of the present disclosure will be described in more detail with reference to the accompanying drawings.

Figure 1:
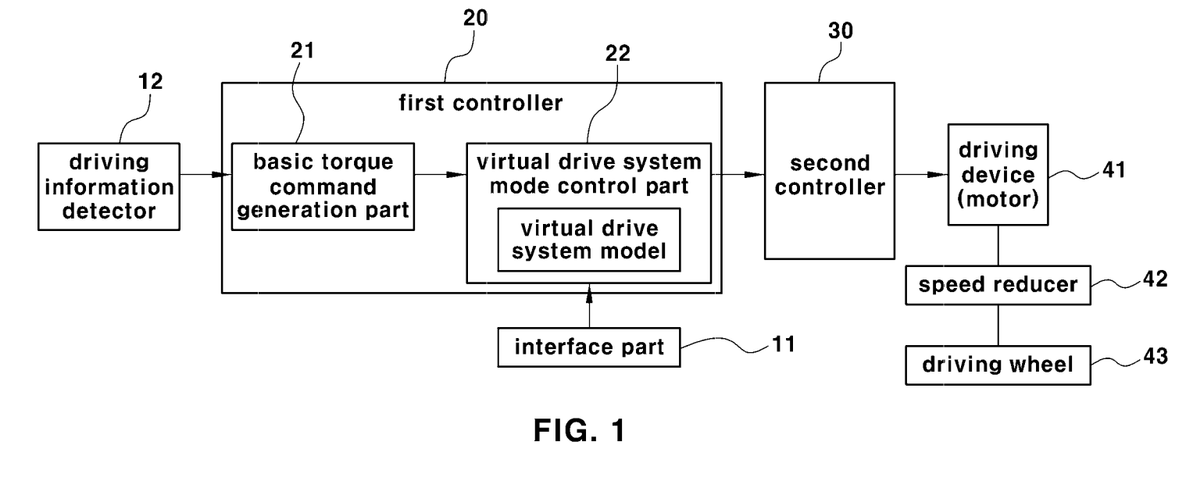
FIG. 1 is a block diagram showing a configuration of a device for controlling an electric vehicle according to an embodiment of the present disclosure.
Figure 2:
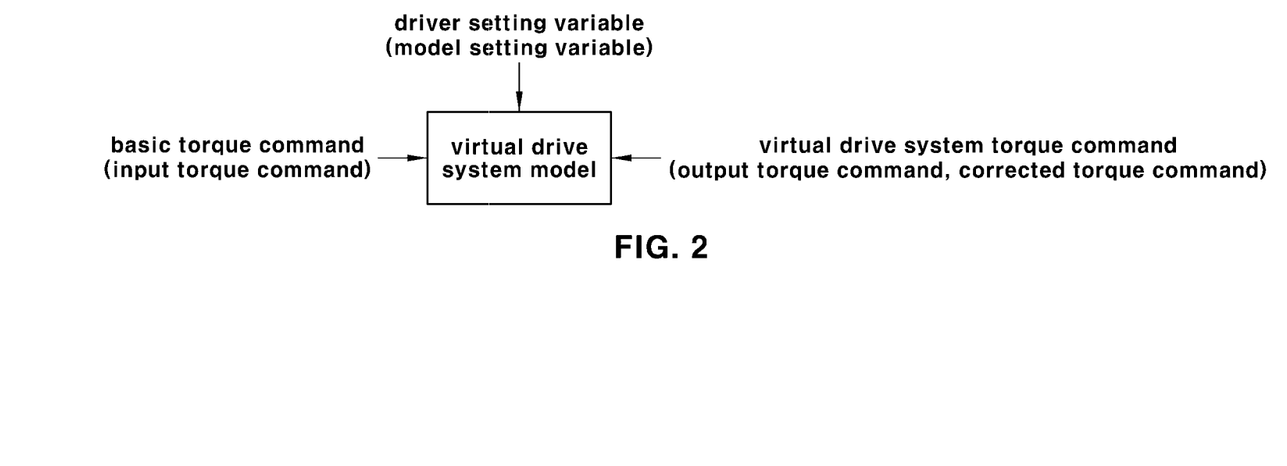
FIG. 2 is a block diagram showing a state in which a torque command corrected by using a virtual drive system model is generated from a basic torque command in the embodiment of the present disclosure.
Figure 3:
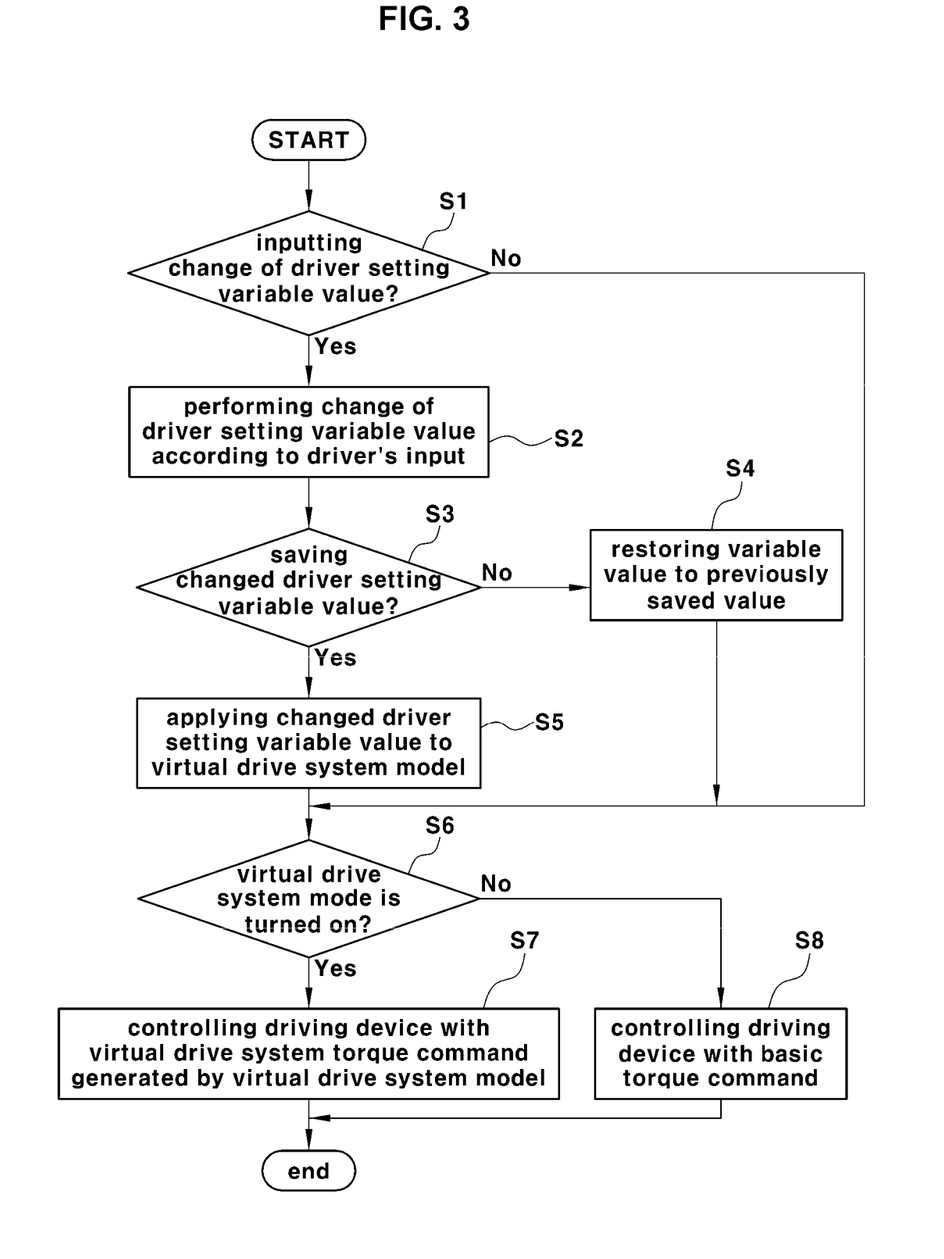
FIG. 3 is a flowchart showing a process of performing a virtual drive system mode in the embodiment of the present disclosure.

FIG. 1 is a block diagram showing a configuration of a device for controlling an electric vehicle according to the embodiment of the present disclosure, and FIG. 2 is a block diagram showing a state in which a torque command corrected by using a virtual drive system model is generated from a basic torque command in the embodiment of the present disclosure. In addition, FIG. 3 is a flowchart showing a process of performing a virtual drive system mode in the embodiment of the present disclosure.

A control method of an electric vehicle according to the embodiment of the present disclosure includes: a change process for directly changing a variable set value (i.e., a driver setting variable value) of a virtual drive system model by a driver while the virtual drive system model for generating and realizing the virtual drive system sensibility is built in a controller; and a control process for operating a virtual drive system mode that virtually generates and realizes driving sensibility (i.e., virtual drive system sensibility) of other drive systems by using the virtual drive system model while driving a vehicle.

In the embodiment of the present disclosure, the virtual drive system model is provided so that a driver may adjust and change a model setting variable value for personalization, that is, a designated driver setting variable value.

In addition, in the control process for the operating of the virtual drive system mode in the embodiment of the present disclosure, a virtual drive system torque command is generated through the virtual drive system model in which a variable set value is changed, and motor torque is controlled according to the generated virtual drive system torque command, so that the control process for a motor is performed to generate and realize the virtual drive system sensibility (i.e., vibration) differentiated for each individual and preferred by a driver.

Referring to FIG. 3, a control method according to the embodiment of the present disclosure is a control process for operation of a virtual drive system mode, the control method including a step S6 of determining a virtual drive system mode, wherein whether the virtual drive system mode is turned on by a driver is determined by a controller, a step of determining a basic torque command, wherein the basic torque command is determined from vehicle driving information collected from a vehicle by the controller when the virtual drive system mode is turned on, a step of determining a corrected final torque command (i.e., virtual drive system torque command), wherein the corrected final torque command is determined for realizing virtual drive system sensibility, from the determined basic torque command, by a virtual drive system model that inputs the basic torque command in the controller, and a step S7 of controlling an operation of a motor, wherein the operation of the motor, which is a driving device for driving a vehicle, is controlled according to the determined final torque command in the controller.

In addition, the control method according to the embodiment of the present disclosure may further include a step of changing a driver setting variable value, wherein the driver setting variable value, designated in the virtual drive system model according to a change input by a driver, is changed in the controller. In the embodiment of the present disclosure, specifically, the changing of the driver setting variable value may include a step S1 of determining whether there is the change input of the driver setting variable value by a driver in the controller, a step S2 of performing the change of the driver setting variable value according to a driver's input in the controller when there is the change input, a step S3 of determining whether save of the changed driver setting variable value is selected by the driver in the controller, and a step S5 of applying the changed driver setting variable value to the virtual drive system model in the controller when the save is selected.

As described above, after the changed driver setting variable value is saved and applied to the virtual drive system model, the final torque command (i.e., virtual drive system torque command) corrected from the basic torque command is determined using the virtual drive system model in which the driver setting variable value is changed during driving of an electric vehicle in the on state of the virtual drive system mode, and operation of a motor that drives a vehicle according to the determined final torque command is controlled (see step S7).

In addition, when there is no change input of the driver setting variable value in step S1, a sequence moves to step S6, and when the save of the driver setting variable value changed in step S3 is not selected, the sequence moves to step S6 after returning the variable value to the previously saved value. When a function of virtual drive system mode is in a state of off in step S6, the controller controls the operation of the motor according to the determined basic torque command (see step S8).

In addition, in describing a configuration of a control device for performing a motor control process for the virtual drive system mode according to the embodiment of the present disclosure, as shown in FIG. 1, the control device includes an interface part 11 provided to allow a driver to select and input one of on and off of a virtual drive system mode of a vehicle and change and input a driver setting variable value for personalization of a function of the virtual drive system mode, a driving information detector 12 for detecting vehicle driving information, a first controller 20 for determining a basic torque command from the vehicle driving information detected by the driving information detector 12 and generating and outputting a virtual drive system torque command by using a virtual drive system model from the determined basic torque command, and a second controller 30 for controlling operation of a driving device 41 according to the virtual drive system torque command output from the first controller 20.

Here, the first controller 20 may be configured to include a basic torque command generation part 21 for determining the basic torque command from the vehicle driving information collected from the vehicle, and a virtual drive system mode control part 22 for generating and outputting the virtual drive system torque command by using the virtual drive system model from the basic torque command determined by the basic torque command generation part 21.

In the following description, the agent of the control are divided into the first controller 20 and the second controller 30, but the control process according to the embodiment of the present disclosure may be performed by one integrated control component instead of a plurality of controllers. When the plurality of controllers or one integrated control component is collectively referred to as the controller, it may be understood that the control process according to the embodiment of the present disclosure is performed by this controller. That is, this controller may be collectively referred to as the first controller and the second controller.

In the control device performing the control process according to the embodiment of the present disclosure, any means may be applicable for the interface part 11 as long as the means enables a driver to operate to select on or off of a virtual drive system mode in a vehicle and is able to change a driver setting variable value of the virtual drive system model by inputting the desired driver setting variable value for personalization. For example, the interface part may be an operation device such as a button or switch provided in the vehicle, and an input device or a touch screen of an ANV (Audio, Video, Navigation) system.

The interface part 11 may be connected to the first controller 20, and accordingly, when there is on or off operation by a driver or change operation of driver setting parameter information by a driver, a signal according to the operation may be input to the first controller 20 in the interface part 11. Accordingly, the first controller 20 may recognize a state in which on or off of the virtual drive system mode is operated by the driver and a state in which driver setting variable information is changed by the driver.

In the embodiment of the present disclosure, operation of the virtual drive system mode and the control process thereof for generating and realizing virtual drive system sensibility (which may be virtual drive system vibration) through motor torque control during driving a vehicle is performed only when the virtual drive system mode is turned on by a driver through the interface part 11 (see step S6 in FIG. 3).

In addition, when the interface part 11 is a vehicle input device provided in a vehicle, instead of such a vehicle input device, although not shown in FIG. 1, the driver may also perform on or off operation of the virtual drive system mode or operation for changing driver setting variable information through a mobile device (not shown).

The mobile device should be capable of being communicatively connected to an in-vehicle device, for example, the first controller 20, and to this end, an input/output communication interface (not shown) for communication connection between the mobile device and the first controller 20 is used.

The driving information detector 12 is a component that detects vehicle driving information required to generate a motor torque command in a vehicle, wherein the vehicle driving information may include driving input information of a driver and vehicle status information.

In the exemplary embodiment of the present disclosure, the driving information detector 12 may include an accelerator pedal detector that detects accelerator pedal input information according to accelerator pedal operation of a driver, and a brake pedal detector that detects brake pedal input information according to brake pedal operation of the driver. In addition, the driving information detector 12 may further include a motor speed detector for detecting rotational speed (hereinafter referred to as "motor speed") of a motor, which is a driving device 41 that drives a vehicle.

Here, the accelerator pedal detector may be a conventional accelerator pedal sensor (i.e., Accelerator Position Sensor, APS) installed on an accelerator pedal and outputting an electric signal according to a driver's accelerator pedal operation state. The brake pedal detector may be a conventional brake pedal sensor (BPS) installed on a brake pedal and outputting an electrical signal according to a driver's brake pedal operation state. In addition, the motor speed detector may be a known resolver installed in the motor (i.e., driving motor) 41.

At this time, the driver's driving input information may include an accelerator pedal input value (APS value) detected by the accelerator pedal detector and a brake pedal input value (BPS value) detected by the brake pedal detector, and the vehicle status information includes the motor speed detected by the motor speed detector.

In addition, the driving information used to generate a basic torque command in the basic torque command generation part 21 to be described later may further include vehicle speed as the vehicle status information. In this case, the driving information detector 12 further includes a vehicle speed detector for detecting driving speed of a vehicle, wherein the vehicle speed detector may be configured to include a wheel speed sensor installed on a driving wheel of the vehicle.

The basic torque command may be a motor torque command determined and generated based on vehicle driving information collected in an ordinary electric vehicle during driving, and the basic torque command generation part 21 may be a vehicle control unit (VCU) that generates the motor torque command on the basis of the vehicle driving information in the ordinary electric vehicle, or a part of the vehicle control unit.

In addition, the virtual drive system mode control part 22 is a novel component that determines, generates, and outputs a virtual drive system torque command from the basic torque command by using a virtual drive system model in which setting variable information may be changed by a driver while receiving the basic torque command as an input in the embodiment of the present disclosure, and the virtual drive system mode control part 22 may be added as a part of the vehicle control unit (VCU), or may be provided as a control component separate from the vehicle control unit.

The second controller 30 is a controller that controls operation of the driving device 41 by receiving the final torque command output from the first controller 20, that is, the virtual drive system torque command that is determined, generated, and output by the virtual drive system mode control part 22 of the first controller 20.

In the embodiment of the present disclosure, the driving device 41 is a motor (i.e., driving motor) that drives a vehicle, and the second controller 30 may be a motor control unit (MCU) that drives the motor through an inverter and controls operation of the motor in a conventional electric vehicle. The torque and rotational force output from the driving device 41 are transmitted to a driving wheel 43 via a speed reducer 42 as shown in FIG. 1.

Meanwhile, in the embodiment of the present disclosure, a virtual drive system model capable of determining and generating a virtual drive system torque command by inputting the basic torque command is input in advance and set in the virtual drive system mode control part 22.

As described above, while the virtual drive system model is set in the virtual drive system mode control part 22, when the basic torque command is input to the virtual drive system mode control part 22 from the basic torque command generation part 21 during operation of the virtual drive system mode, a virtual drive system torque command is generated by correcting the basic torque command according to the driver setting variable information in the virtual drive system model of the virtual drive system mode control part 22.

Consequently, the driving force generated by a vehicle during the operation of the virtual drive system mode is not the basic torque command, but becomes the driving force, generated by the motor 41 operating according to the virtual drive system torque command, and thus a driver is able to experience sensibility and characteristics of the virtual drive system by the driving force generated by the motor 41 according to the virtual drive system torque command.

In particular, in the virtual drive system model, a driver may adjust a driver setting variable value to the value he or she wants, and the virtual drive system torque command is determined and output according to the driver setting variable value adjusted by the driver in the virtual drive system model.

Therefore, by adjusting the driving setting variable value by the driver, even under the same vehicle driving condition, the driving force generated and output from the motor 41 may be differentiated, and the personalization of the virtual drive system sensibility may be achieved, in which individually differentiated sensibility and characteristics of the virtual drive system is provided to the driver.

In the exemplary embodiment of the present disclosure, the driver setting variable information in the virtual drive system model may include at least one or more of stiffness of virtual drive system (i.e., spring rate, k), damping amount of virtual drive system (i.e., damping rate, d), and inertia of virtual drive system (i.e., weight of virtual drive system (mass, m)).

In addition, in the exemplary embodiment of the present disclosure, when realization of virtual drive system sensibility is realization of drive system vibration through motor torque control, the driver setting variable information in a virtual drive system model may include at least one or more of vibration frequency (i.e., resonance frequency, $f_n$) of virtual drive system torque (which is a command), damping ratio of virtual drive system torque (i.e., damping ratio, $\zeta$) and amplitude of virtual drive system torque (i.e., amplitude, A).

The driver setting variable information is used to establish a virtual drive system model, and further, is used to convert the basic torque command into a virtual drive system torque command in the virtual drive system model during operation of the virtual drive system mode.

In addition, a driver setting variable value of the virtual drive system model may be adjusted by a driver to a value desired by the driver himself of herself through the interface part 11, and a virtual drive system torque command, which is converted from the basic torque command according to the value adjusted by the driver, is changed. Accordingly, when the motor 41 is controlled according to the converted virtual drive system torque command, the differentiated virtual drive system sensibility may be provided to the driver.

In the exemplary embodiment of the present disclosure, FIG. 2 is a view showing that a virtual drive system model of the virtual drive system mode control part 22 generates and outputs a virtual drive system torque command, which is a corrected torque command, by inputting the basic torque command generated and output by the basic torque command generation part 21.

Hereinafter, the virtual drive system model will be described in more detail.

In the embodiment of the present disclosure, a virtual drive system model is preset in the virtual drive system mode control part 22 for operation of a virtual drive system mode, and is set to output a virtual drive system torque command by inputting the basic torque command.

In addition, in the embodiment of the present disclosure, a virtual drive system model serves to convert the basic torque command without a vibration component into a virtual drive system torque command that includes a vibration component, and in the virtual drive system model, a driver setting variable value described above is used to convert the basic torque command into the virtual drive system torque command.

In a conventional vehicle, control methods for driving force or torque are all aimed at eliminating vehicle vibration, but in the embodiment of the present disclosure, driving force control or torque control is performed, wherein in a desired form, vibration is able to be added instead.

In the exemplary embodiment of the present disclosure, a mass-spring-damper system model is fundamentally used as a virtual drive system model. In the exemplary embodiment of the present disclosure, when the conventional mass-spring-damper system model is used as the virtual drive system model, the basic torque command (which is an input torque command of the model) is substituted as input force to be used in the mass-spring-damper system.

In addition, in the exemplary embodiment of the present disclosure, when using the conventional mass-spring-damper system model as the virtual drive system model, a sum of spring force and damping force in the mass-spring-damper system becomes a virtual drive system torque command (i.e., corrected torque command) which is an output torque command of the model.

Here, the conventional mass-spring-damper system model refers to a system as shown in Equation 1 below, wherein a total sum (or difference) of spring force which is the product of displacement and spring stiffness (i.e., spring rate), damping force which is the product of speed (i.e., differential value of displacement) and the damping rate, and input force is balanced with the product of inertia (i.e., weight) and acceleration (i.e., differential value of speed).

When expressed mathematically, the above system is defined as following differential equation:

$$F_{in} - kx - d\dot{x} = m\ddot{x} \qquad \text{Equation 1}$$

where $F_{in}$ is input force, k is spring rate, d is damping rate of a damper, m and x are respectively inertia (weight) and displacement of mass, $\dot{x}$ is speed, and $\ddot{x}$ is acceleration, separately.

In the above equation, kx represents spring force and $d\dot{x}$ represents damping force.

In addition, output force is the sum of spring force and damping force ("output force=spring force+damping force"), the input force is the basic torque command, and the output force is the virtual drive system torque command.

In the virtual drive system model of Equation 1, at least one or more of k, d, and m become driver setting variables described above in the exemplary embodiment of the present disclosure, and which are variables that may be controlled by a driver, and in the embodiment of the present disclosure, the driver may adjust the driver setting variable values through the interface part 11.

That is, through the interface part 11, a driver may be allowed to adjust the stiffness of virtual drive system (i.e., spring rate, k), the damping amount of virtual drive system (i.e., damping rate, d), and the inertia of the virtual drive system (i.e., mass, m), which are driver setting variables. By adjusting these variable values, the characteristics of the virtual drive system model may be changed, and a form of virtual drive system torque command corrected and converted from the basic torque command may be changed.

The k, d, and m are respectively virtual physical values, and a driver may directly adjust values of direct parameters such as k, d, and m of the virtual drive system model. However, as a more intuitive personalization method, instead of adjusting the virtual physical variables, a function of adjusting characteristics of a virtual drive system model may be provided by adjusting a values of a derived parameter.

The natural vibration frequency of virtual drive system torque (i.e., resonance frequency, $f_n$), the damping ratio of virtual drive system torque (i.e., damping ratio, $\zeta$) and the amplitude of virtual drive system torque (i.e., amplitude, A) may be representatively defined as the derived parameters. An advantage of this method is that each derived variable does not affect each other.

For example, when a value of k is increased, there is an effect in that not only a vibration cycle is speeded up, but also damping is weakened even though a value of d is fixed, whereby the variables affect each other. However, when increasing the natural vibration frequency, it is possible that only the vibration cycle is speeded up, and the damping ratio is maintained.

In the exemplary embodiment of the present disclosure, the natural vibration frequency (i.e., resonance frequency, $f_n$) of the virtual drive system torque is a variable that determines frequency of a virtual drive system torque vibration, and the virtual drive system damping ratio (i.e., damping ratio, $\zeta$) is a variable that determines the degree to which the vibration of the virtual drive system torque is damped and extinguished.

In addition, in the exemplary embodiment of the present disclosure, in describing amplitude (A) of virtual drive system torque, first, the amplitude of the virtual drive system torque is a variable that determines magnitude of torque vibration, and the amplitude may not be adjusted independently in the general mass-spring-damper system. The reason is that the amplitude is expressed as a function of frequency and damping ratio.

Accordingly, the embodiment of the present disclosure proposes a method for adjusting the amplitude. The method to adjust only the amplitude A of vibration to be added while maintaining a value of the basic torque command, which is input torque, is as follows.

$$AF_{in} - m(2\pi f_n)^2 x - 2\zeta\sqrt{mk}\dot{x} = m\ddot{x} \qquad \text{Equation 2}$$

In the above Equation 2, $m(2\pi f_n)^2 x$ corresponds to spring force, and $2\zeta\sqrt{mk}\dot{x}$ corresponds to damping force. Here, output torque, that is, a corrected and converted virtual drive system torque command is as shown in the following Equation 3.

$$\begin{aligned}\text{Output torque} &= \text{spring force} + \text{damping force} - (A-1)\\ & F_{in}^*\end{aligned} \qquad \text{Equation 3}$$

In the above Equation 3, $F_{in}^*$ is the basic torque command corresponding to the input force.

The above equation is expressed using a derived parameter, and through this equation, the amplitude (A) may be individually adjusted separating from the natural vibration frequency (i.e., resonance frequency, $f_n$) and damping ratio ($\zeta$). Here, the displacement (x) value serves as an intermediate variable for calculating the output torque, and the output torque (i.e., virtual drive system torque command) is used to control the driving force of an actual vehicle.

Figure 4:
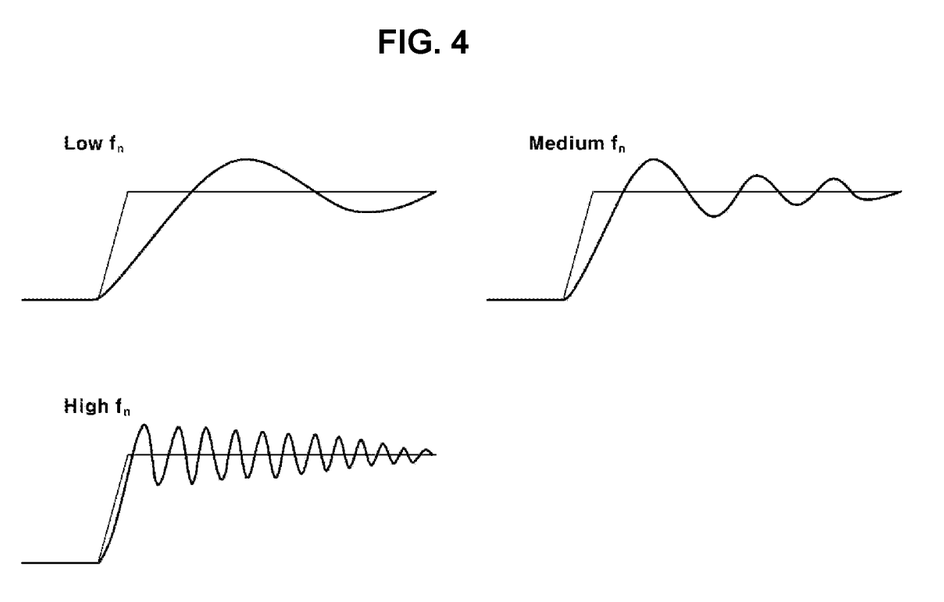
FIGS. 4, 5, and 6 are views showing examples of personalization and correction of torque commands in realizing virtual drive system sensibility according to the embodiment of the present disclosure.
Figure 5:
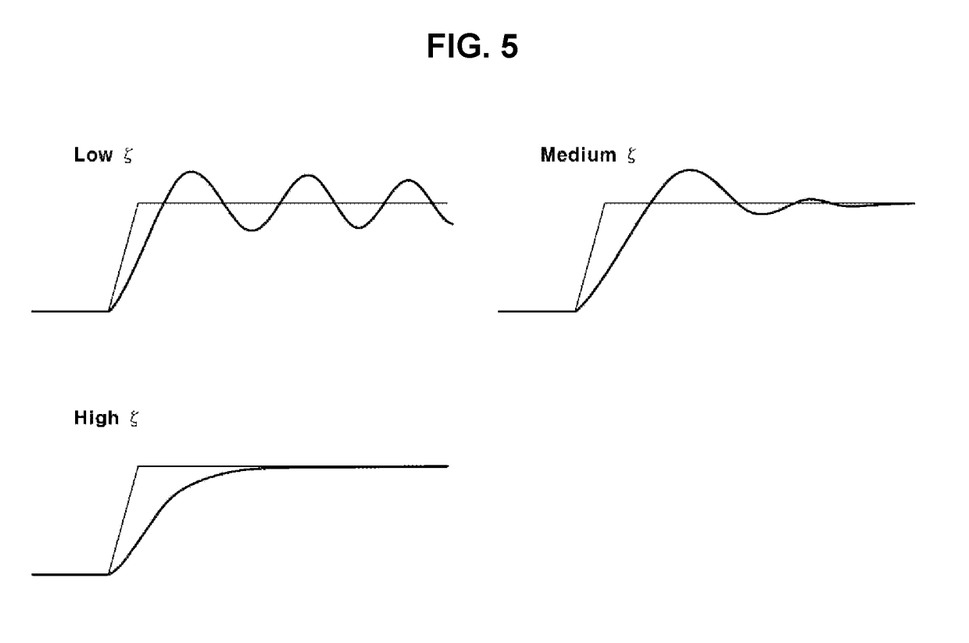
Figure 6:
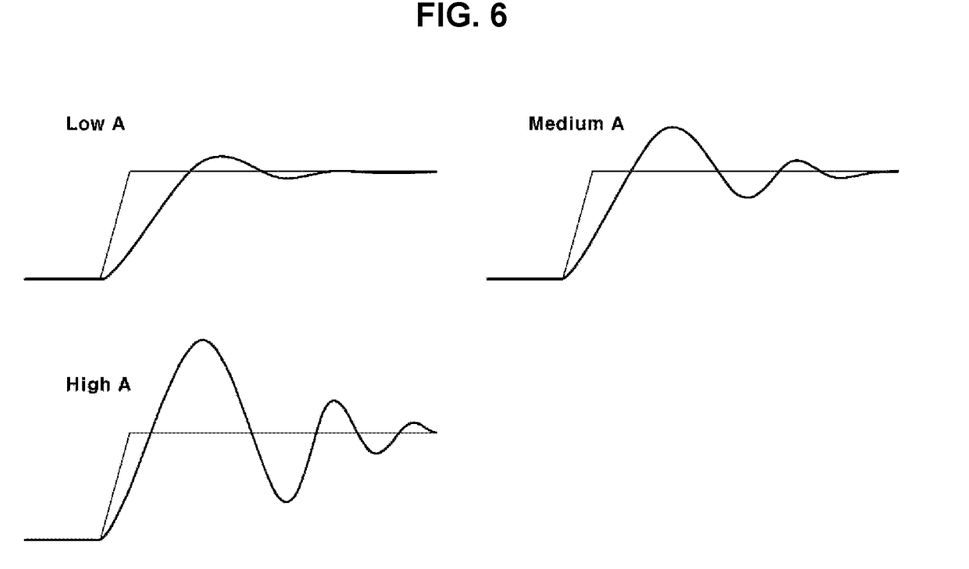

FIGS. 4 to 6 are views showing examples of personalization and correction of torque commands in realizing virtual drive system sensibility according to the embodiment of the present disclosure. In FIGS. 4 to 6, together with the basic torque command, a virtual drive system torque command converting the basic torque command by using driver setting variable information is shown.

FIG. 4 is a view showing an example in which the natural vibration frequency (i.e., resonance frequency, $f_n$) of the virtual drive system, as driver setting variable information, is set differently by values of high frequency (High $f_n$), medium frequency (Medium $f_n$), and low frequency (Low $f_n$).

FIG. 5 is a view showing an example in which damping ratio ($\zeta$) of the virtual drive system, as driver setting variable information, is set differently by values of a high damping ratio (High $\zeta$), a medium damping ratio (Medium $\zeta$), and a low ratio (Low $\zeta$).

FIG. 6 is a view showing an example in which the virtual drive system amplitude (i.e., amplitude, A), as the driver setting variable information, is set differently by the values of high amplitude (High A), medium amplitude (Medium A), and low amplitude (Low A).

In addition to the method of defining the amplitude A as above, another method of obtaining a final torque command by adjusting the amplitude A is applicable. The final corrected virtual drive system torque command may be obtained in a way in which a difference value between the corrected torque command and the basic torque command obtained through the above-described virtual drive system model is fundamentally obtained, the difference value is multiplied by a setting value of amplitude A, which is the driver setting variable value, and this multiplied value is summed with the basic torque command. In other word, that is a method in which a difference between an input value and an output value of the virtual drive system model is obtained, the value multiplied by a setting value of amplitude A is added to the input value, and the summed value is used as the final torque command (i.e., final virtual drive system torque command).

In addition, yet another method of obtaining the final torque command may be applied by adjusting the amplitude A. There is a method in which a value of the output torque command (i.e., first corrected torque command) obtained by using the conventional mass-spring-damper system model as the virtual drive system model is input to a virtual drive system model again, and at this time, the output torque command obtained through the virtual drive system model is obtained as the value of the final torque command (i.e., second corrected torque command which is the final virtual drive system torque command). That is, by using the virtual drive system model twice, the method shown in FIG. 7 may be applied.

Figure 7:
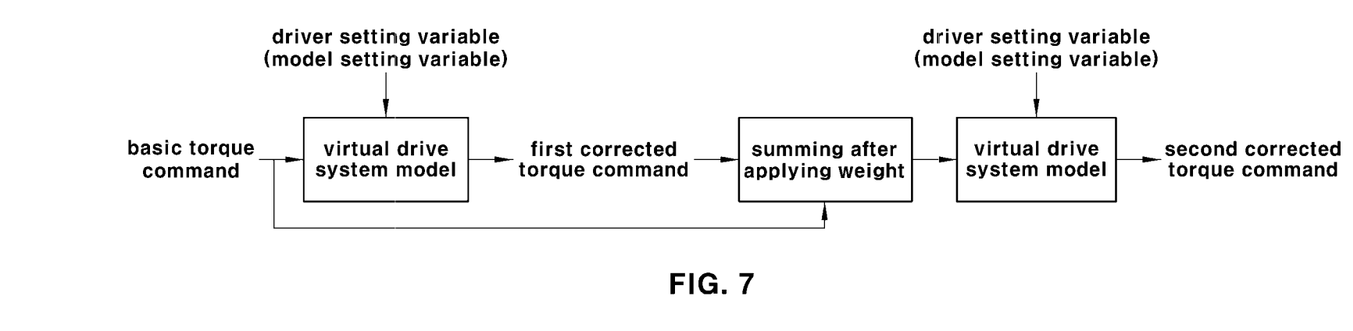
FIG. 7 is a block diagram showing an example of a method of adjusting amplitude in the embodiment of the present disclosure.

As shown in FIG. 7, the basic torque command (i.e., input torque command) is input to a virtual drive system model to obtain a first corrected torque command, which is an output torque command, and after respectively applying predetermined weights to the first corrected torque command and basic torque command, the summed value is used as an input torque command of the second virtual drive system model. At this time, the amplitude A may be used as a weight for the first corrected torque command. In addition, as the set value of the amplitude A is larger, the weight for the first corrected torque command may be set to a value that is increased further compared to the weight for the basic torque command.

Meanwhile, in the exemplary embodiment of the present disclosure, a method for preventing signal divergence may be applied, wherein an output signal may be diverged due to a discretization error, system's mathematical instability caused by set values, etc. In order to prevent this problem, it is possible to define ranges of personalized set values without risk of divergence, and limit fluctuations of the set values within these ranges. That is, a lower limit and an upper limit are predetermined and applied to each set value.

Even though the set values are applied within the allowable ranges due to the discrete error, it is possible to prevent system signals from diverging, wherein divergence symptoms may be prevented by way of reducing the set values on the basis of overflow of the signals after detecting thereof.

That is, when magnitude of an absolute value of the signal value of x or ẋ is greater than a predefined threshold, or when sign of positive (+)/negative (−) changes every sample time, or when these phenomena persist for a predetermined time, this condition is determined as divergent. In addition, when it is determined as a divergent state, the value of the natural vibration frequency (i.e., resonance frequency, $f_n$) and damping ratio ($\zeta$) set by a driver or already set are reduced in a predetermined manner comparing to a value at the previous sample time. The reduction measure is repeated until the condition of the divergent state is over.

In addition, in the exemplary embodiment of the present disclosure, when using the virtual drive system torque command, a method for solving the drive system backlash problem may be applied. In the vicinity of a situation (i.e., near zero torque) in which a torque value is switched between the driving direction and the regenerative direction, a backlash shock may occur as the arrangement direction of the drive system gears changes. In order to prevent this problem, vibration may be removed only in a defined backlash section where there is a possibility of occurrence of the backlash shock.

As a method for solving this problem, the method of adjusting the amplitude A may be applied. When the basic torque command enters a predetermined backlash section, the amplitude A is reduced to a value of 0, and then when the basic torque command leaves the backlash section, the reduced amplitude A may be restored to the original set value. It is possible to apply a rate limit or a filter to the amplitude A that is adjusted in the process of reducing and restoring the amplitude A, and the virtual drive system torque command is allowed to be determined by using the amplitude A to which the rate limit or the filter is applied.

In the exemplary embodiment of the present disclosure, to explain more about the backlash section, a shock due to a gear backlash may occur in the drive system including a speed reducer at a time when a direction of motor torque is changed. Accordingly, the backlash section may be preset in the controller as a section of a predetermined torque range (i.e., torque band) approximating the zero torque, including zero (0) torque.

At this time, the backlash section is composed of a negative (−) torque area and a positive (+) torque area, which are divided based on the zero (0) torque. That is, the backlash section may be referred to as a torque section in which a predetermined negative (−) torque value is set as the minimum value and a predetermined positive (+) torque value is set as the maximum value. In addition, the backlash section may be set for each drive system rotation speed or torque area.

In the embodiment of the present disclosure, the fact that the direction of the motor torque is switched means that the motor torque is converted from a positive (+) value to a negative (−) value, or conversely, is converted from the negative value to the positive value. Here, positive (+) motor torque means driving torque, and negative (−) motor torque means regenerative torque.

In addition, in the exemplary embodiment of the present disclosure, a method using a transfer function model may be applied. In order to be applicable, the entire virtual drive system model may be converted into the transfer function because the virtual mass-spring-damper system may be expressed in the form of the transfer function as a linear system. As described above, an input of the transfer function is also the basic torque command, and an output thereof is a virtual drive system torque command which is a corrected torque command. The method of converting the mass-spring-damper linear system into the transfer function is a well-known method, and thus a detailed description herein will be omitted.

Figure 8:
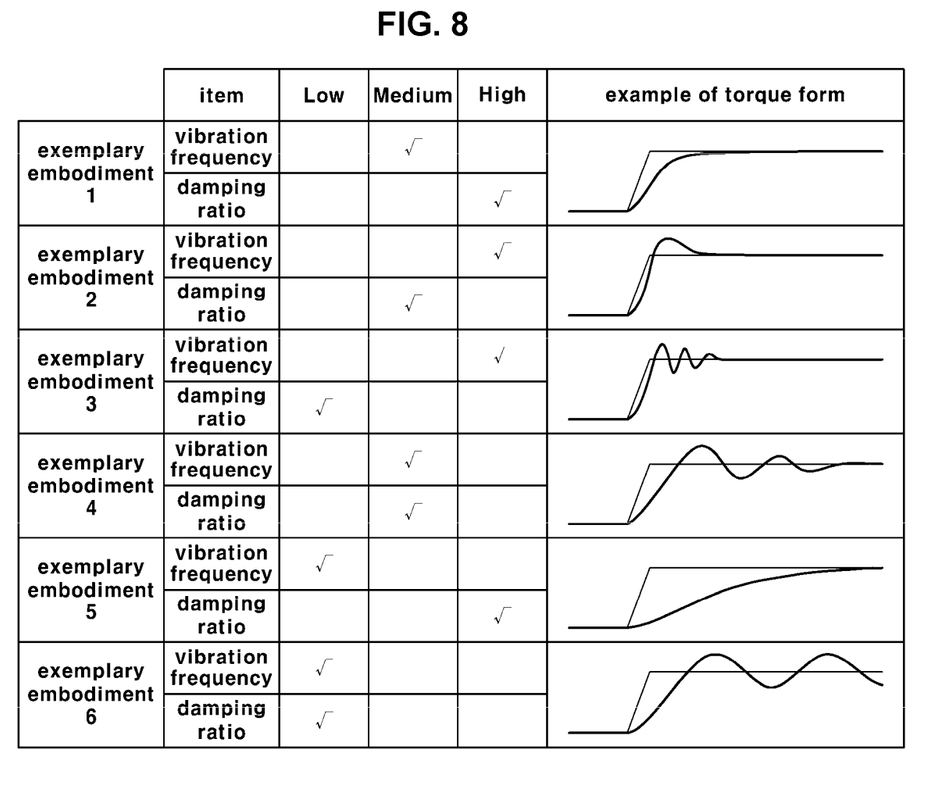
FIG. 8 is a view showing examples of various torque forms depending on set values of natural vibration frequency and damping ratio in the embodiment of the present disclosure.

FIG. 8 is a view showing examples of various torque forms according to set values of the natural vibration frequency and damping ratio in the embodiment of the present disclosure, and exemplary embodiment 1 shows a daily driving and comfort mode that provides adequate acceleration/deceleration response and smooth driving.

Exemplary embodiment 2 is an example of realizing sensibility of a high-performance GT car (i.e., Grand Touring Car), and is the example of providing driving performance without great inconvenience even for long-distance travel even though fast responsiveness is important. Exemplary embodiment 3 is an example in which sensibility of a sports car is realized, and is the example of providing an intuitive torsional sensibility of a drive system due to immediate acceleration/deceleration response and strong torque output.

Exemplary embodiment 4 is an example of realizing sensibility of a large vehicle such as a bus, and is the example of providing sensibility of low-frequency vibration due to large gear backlash and high inertia. Exemplary embodiment 5 is an example of providing a gentle acceleration/deceleration sensibility without a step by removing a sharp driving input, and exemplary embodiment 6 is an example of providing sensibility, which is like inducing infants' sleep with continuous and smooth motion in the front and rear directions, while sufficiently reflecting a driver's will.

In this way, according to the control method of the embodiment of the present disclosure described above, various characteristics that may be provided by other drive systems, such as the drive system of the internal combustion engine vehicle, are virtually realized and simulated using the motor in the electric vehicle according to the driver's request.

Although it is possible to produce vibration by simply adding a continuous vibration pattern determined according to a set value, in this case, the vibration that is not realistic may be provided to a driver. Therefore, in the embodiment of the present disclosure, the virtual drive system model is used to add the vibration torque that reflects the driver's acceleration/deceleration will.

As a result, according to the embodiment of the present disclosure, it is possible to realize a highly realistic vibration torque, it is possible for a driver to feel driving sensation as if the drive system of an actual vehicle is changed through tuning, rather than sensing simple vibration, and it is possible to provide a unique vehicle marketability that allows the driver to experience not only the drive system of his or her own vehicle, but also the drive systems of various vehicle types.

Although the embodiments of the present disclosure have been described in detail as above, the scope of the present disclosure is not limited thereto, and various modifications and improvements of those skilled in the art using the basic concepts of the present disclosure as defined in the following claims are also included in the scope of the present disclosure.

The invention claimed is:

1. A control method of an electric vehicle for realizing virtual drive system sensibility, the control method comprising:
    determining, by a controller, a basic torque command for controlling operation of a driving motor based on vehicle driving information collected while driving a vehicle;
    determining, by the controller, a virtual drive system torque command, as corrected from the basic torque command, based on adjusting and changing a model setting variable value of a virtual drive system model preset, thereby realizing the virtual drive system sensibility; and
    controlling, by the controller, a torque of the driving motor according to the virtual drive system torque command.

2. The control method of claim 1, wherein the virtual drive system torque command, which is obtained by adding a vibration component to the basic torque command, is a motor torque command having a value that changes in a vibration form.

3. The control method of claim 1, wherein the model setting variable value is a driver setting variable value, further comprising:
    changing, by the controller, the driver setting variable value preset in the virtual drive system model, which is used to determine the virtual drive system torque command based on the basic torque command according to a driver's change input.

4. The control method of claim 3, wherein the virtual drive system torque command, which is obtained by adding a vibration component to the basic torque command, is a motor torque command having a value that changes in a vibration form, and a driver setting variable determined in the virtual drive system model comprises at least one or more of vibration frequency of the virtual drive system torque command, a damping ratio of the virtual drive system torque command, and amplitude of the virtual drive system torque command.

5. The control method of claim 4, wherein a mass-spring-damper system model is used as the virtual drive system model in the controller.

6. The control method of claim 4, wherein, in the determining of the virtual drive system torque command, the corrected torque command is determined by the virtual drive system model by inputting the basic torque command, and
    the virtual drive system torque command is determined by
        a value obtained by adding the basic torque command and a value obtained by multiplying a difference value between the corrected torque command and the basic torque command by the amplitude which is the driver setting variable value.

7. The control method of claim 4, wherein, in the determining of the virtual drive system torque command, a first corrected torque command corrected by the virtual drive system model by inputting the basic torque command is determined;
    a summed value is obtained after applying a weight to each of the first corrected torque command and the basic torque command;
    a second corrected torque command corrected by the virtual drive system model by inputting the summed value is determined as the virtual drive system torque command; and
    the weight applied to the first corrected torque command is the amplitude which is the driver setting variable value.

8. The control method of claim 4, wherein, in the controller, when the basic torque command enters a preset backlash section, the amplitude is reduced to a value of zero, and when the basic torque command leaves the preset backlash section, the amplitude is restored to a value set by a driver.

9. The control method of claim 8, wherein the preset backlash section is set to a section of a torque range approximating the value of zero, and is set as a torque section in which a predetermined negative torque value is a minimum value, and a predetermined positive torque value is a maximum value.

10. The control method of claim 4, wherein a mass-spring-damper system model is used as the virtual drive system model in the controller, wherein the virtual drive system torque command is determined by an equation: spring force+damping force−$(A-1)F^*_{in}$, where A is the amplitude of the virtual drive system torque command, and $F^*_{in}$ is the basic torque command.

11. The control method of claim 3, wherein the controller uses a mass-spring-damper system model as the virtual drive system model, wherein input force is the basic torque command, and output force, which is a sum of spring force and damping force, is the virtual drive system torque command.

12. The control method of claim 11, wherein, in $F_{in}-kx-d\dot{x}=m\ddot{x}$, an equation representing the mass-spring-damper system model, a product of displacement x and a spring rate k is the spring force, a product of speed ẋ, which is a differential value of the displacement, and the damping rate d is the damping force, and a determined driver setting variable is at least one or more of the spring rate k, the damping rate d, and the weight m.

13. A control device of an electric vehicle, the control device comprising:
a first controller generating and outputting a virtual drive system torque command; and
a second controller controlling torque of a driving motor according to the virtual drive system torque command output from the first controller,
wherein the first controller comprises:
a basic torque command generation part for determining a basic torque command, and for controlling operation of the driving motor from vehicle driving information collected during driving a vehicle; and
a virtual drive system mode control part for determining the virtual drive system torque command, which is a corrected torque command for realizing virtual drive system sensibility, from the basic torque command determined by the basic torque command generation part by using a set virtual drive system model in a state where the virtual drive system model is preset;
wherein the virtual drive system model is provided such that an interface part directly adjusts and changes a model setting variable value for personalization of a driver.

14. The control device of claim 13, wherein the virtual drive system torque command, which is obtained by adding a vibration component to the basic torque command, is a motor torque command having a value that changes in a vibration form.

15. The control device of claim 13, further comprising:
an interface part provided to allow a driver to input a change of a driver setting variable value determined in the virtual drive system model set in the virtual drive system mode control part.

16. The control device of claim 15, wherein the virtual drive system torque command, which is obtained by adding a vibration component to the basic torque command, is a motor torque command having a value that changes in a vibration form, and
a driver setting variable determined in the virtual drive system model comprises at least one or more of a vibration frequency of the virtual drive system torque command, a damping ratio of the virtual drive system torque command, and amplitude of the virtual drive system torque command.

17. The control device of claim 16, wherein a mass-spring-damper system model is used as the virtual drive system model.

18. The control device of claim 15, wherein a mass-spring-damper system model is used as the virtual drive system model, and
in the mass-spring-damper system, input force is the basic torque command, and output force, which is a sum of spring force and damping force, is the virtual drive system torque command.

19. A control method of an electric vehicle for realizing virtual drive system sensibility, the control method comprising:
determining, by a controller, a basic torque command for controlling operation of a driving motor based on vehicle driving information collected while driving a vehicle;
determining, by the controller, a virtual drive system torque command, as corrected from the basic torque command, based on adjusting and changing a model setting variable value of a virtual drive system model preset, thereby realizing the virtual drive system sensibility; and
controlling, by the controller, a torque of the driving motor according to the virtual drive system torque command;
wherein the model setting variable value includes at least one or more of stiffness of virtual drive system, damping amount of virtual drive system, and inertia of virtual drive system.

* * * * *